United States Patent [19]

Takabatake et al.

[11] Patent Number: 5,847,036

[45] Date of Patent: Dec. 8, 1998

[54] (METH)ACRYLIC MOLDING MATERIAL AND A PRODUCTION PROCESS THEREOF

[75] Inventors: Kouji Takabatake, Minoo; Yuichi Kawata, Takatsuki; Shigeo Otome, Sanda, all of Japan

[73] Assignee: Nippon Shokubai Co., Ltd., Osaka, Japan

[21] Appl. No.: 668,232

[22] Filed: Jun. 21, 1996

[30] Foreign Application Priority Data

Jun. 21, 1995 [JP] Japan .................................. 7-154576

[51] Int. Cl.$^6$ ................................................ C08K 5/09
[52] U.S. Cl. .................... 524/321; 524/112; 524/285; 524/287; 524/437; 524/531; 524/549; 524/556; 524/560; 524/773; 524/774; 524/776; 524/780; 524/786; 524/433; 524/436; 525/285; 526/271
[58] Field of Search ................... 524/321, 556, 524/560, 773, 531, 437, 112, 549, 287, 285, 774, 776, 780, 786, 433, 436; 525/285; 526/271

[56] References Cited

U.S. PATENT DOCUMENTS

| | | | |
|---|---|---|---|
| 4,011,195 | 3/1977 | Self et al. | 521/122 |
| 4,067,845 | 1/1978 | Epel et al. | 525/28 |
| 4,189,451 | 2/1980 | Dudinyak | 525/262 |
| 4,192,791 | 3/1980 | Self | 525/249 |
| 4,251,576 | 2/1981 | Osborn et al. | 428/331 |
| 4,299,927 | 11/1981 | Dombroski | 525/64 |
| 4,347,331 | 8/1982 | Self | 521/119 |
| 4,415,690 | 11/1983 | Grimm | 524/112 |
| 4,444,935 | 4/1984 | Miller et al. | 524/560 X |
| 4,483,956 | 11/1984 | Uchiyama | 524/560 X |
| 4,650,821 | 3/1987 | Leonard | 524/560 X |
| 4,734,452 | 3/1988 | Hashimoto et al. | 524/533 X |
| 4,771,095 | 9/1988 | Hanisch et al. | 524/437 |
| 4,868,239 | 9/1989 | Bernhardt et al. | 524/437 X |
| 5,073,587 | 12/1991 | Edwards | 524/437 X |
| 5,130,113 | 7/1992 | Kitayama et al. | 524/437 X |
| 5,135,981 | 8/1992 | Matsumaru et al. | 526/279 |
| 5,145,903 | 9/1992 | Duncan | 524/437 |
| 5,212,217 | 5/1993 | Yukawa et al. | 523/434 |
| 5,223,565 | 6/1993 | Takayama et al. | 524/437 |
| 5,304,592 | 4/1994 | Ghahary | 524/437 |
| 5,331,041 | 7/1994 | Takayama et al. | 524/555 |
| 5,364,903 | 11/1994 | Takayama et al. | 524/437 |
| 5,382,619 | 1/1995 | Takayama et al. | 524/437 |
| 5,444,115 | 8/1995 | Hu et al. | 524/437 |
| 5,530,041 | 6/1996 | Minghetti et al. | 524/437 X |

FOREIGN PATENT DOCUMENTS

| | | |
|---|---|---|
| 49 104937 | 10/1974 | Japan . |
| 38561 | 3/1977 | Japan . |
| 52 38561 | 3/1977 | Japan . |
| 64 11652 | 2/1989 | Japan . |
| 1 302 403 | 1/1973 | United Kingdom . |

OTHER PUBLICATIONS

Database WPI, Derwent Publications, AN–95–012002, JP–A–06 299 034, Oct. 25, 1994.

*Primary Examiner*—Judy M. Reddick
*Attorney, Agent, or Firm*—Oblon, Spivak, McClelland, Maier & Neustadt, P.C.

[57] ABSTRACT

The present invention provides a (meth)acrylic molding material comprising (A) a (meth)acrylic polymer obtained by polymerization of monomer components essentially containing a monomer having (a) carboxyl group(s) and an alkyl (meth)acrylate monomer, and (B) one or more kinds of monomers containing a vinyl group, wherein 30–600 parts by weight of aluminum hydroxide and 0.01–10 parts by weight of a succinic acid derivative are added for 100 parts by weight of the total of said polymer (A) and monomer (B). The (meth)acrylic molding material is thickened by aluminum hydroxide and the thickening behavior is controlled by the succinic acid derivative to prevent the viscosity from increasing with time, accordingly, the (meth)acrylic molding material shows good workability.

8 Claims, No Drawings

(METH)ACRYLIC MOLDING MATERIAL AND A PRODUCTION PROCESS THEREOF

BACKGROUND OF THE INVENTION

The present invention relates to a molding material whose main constituent is a so-called "acrylic syrup" comprising a (meth)acrylic polymer (methacrylic polymer and/or acrylic polymer) and a vinyl monomer (hereinafter referred to as a (meth)acrylic molding material). More particularly the invention relates to a (meth)acrylic molding material the viscosity of which can be easily controlled during the molding operation, and which can be used for various molding methods employing a sheet molding compound (SMC), bulk molding compound (BMC) or cast molding compound, and to a production process thereof.

A molding material mainly containing an unsaturated polyester resin has been well known as a material for a fiber reinforced plastics (FRP), and for the production of FRP, control of the viscosity of the molding material is inevitable. That means, for a process to impregnate a reinforcing material, or the reinforcing fiber with a matrix resin, the matrix resin having a low viscosity is advantageous since it has a higher impregnating ability, but after the impregnation, it is desired to increase the viscosity so that the product can be handled as SMC or BMC, and after SMC or BMC is produced, the viscosity is then desired not to change with time.

For example, it is described in Japanese Patent Laid-Open No. 52-38561 that magnesium oxide and a succinic acid derivative are added to an unsaturated polyester resin comprising an unsaturated polyester having a specific acid value and an average molecular weight of from 1500 to 5000, and an ethylenic unsaturated monomer. This invention teaches that the problems of difficult viscosity control—for example, the use of a thickener such as magnesium oxide causes too rapid increase in the viscosity of the molding material that results in too short time for impregnation of the reinforcing fiber, or on the contrary, the decrease of the thickener prevents the viscosity increase so that it takes too long time for SMC and BMC to reach the ideal viscosity—could be solved by the combined use of an unsaturated polyester resin, a thickener, and a succinic acid derivative (however, the reason why the viscosity controlling effect was shown was not made clear).

By the way, a molding material mainly containing polymethyl methacrylate has been used in various fields since it provides a molded product having good transparency, good weather resistance, good appearance and good gloss of a surface etc. Such (meth)acrylic molding material is often used in a liquid condition called an acrylic syrup wherein a polymer is mixed with a monomer. Japanese Patent Laid-Open No. 49-104937 discloses an acrylic syrup comprising a mixture of a polymer obtained by co-polymerization of methyl methacrylate, ethyl acrylate and acrylic acid and a monomer such as methyl methacrylate. In this example, carboxyl group is introduced into the polymer by the use of the acrylic acid, and the viscosity is controlled to a level suitable for the molding operation by adding a thickener such as magnesium oxide and magnesium hydroxide. Japanese Patent Publication No. 64-11652 discloses a cross-linking type acrylic syrup containing a polymer having a carboxyl group and a polyfunctional monomer, and teaches that the viscosity control is carried out by the use of magnesium oxide and the like. That means, similar to the case of an unsaturated polyester resin, the reaction between magnesium oxide and carboxyl group were used for thickening process also in the (meth)acrylic molding material.

However, the following phenomenon was recognized when aluminum hydroxide blended as an inorganic filler was mixed with an acrylic syrup containing a polymer having carboxyl group. Specifically, immediately after they were mixed by applying a shear force, the viscosity of the molding material remained low, however, later the viscosity continued to increase with time. Such a phenomenon occurred despite the fact that a certain amount of thickener, magnesium oxide was added to the molding material to attain a proper viscosity. As a result, the control of thickening condition was very difficult. Such erratic thickening condition results in various practical problems in the molding operation, for example it may require a long time to reach the desired viscosity, or the viscosity becomes too high to make the molding operation very difficult etc., besides, the quality of the obtained molded products varies as well, thus this has been desired eagerly to be improved.

SUMMARY OF THE INVENTION

Accordingly, it is an object of the present invention to provide a (meth)acrylic molding material having carboxyl group, the thickening behavior of which is controlled to prevent the change of the viscosity with time, and which can be applied to various molding methods, and a process for producing said (meth)acrylic molding material.

The (meth)acrylic molding material of the present invention which achieved the above-mentioned object comprises an acrylic syrup comprising (A) a (meth)acrylic polymer obtained by polymerization of monomer components essentially containing a vinyl monomer having (a) carboxyl group(s) and an alkyl (meth)acrylate monomer, and (B) one or more monomers containing a vinyl group, wherein aluminum hydroxide and a succinic acid derivative are added in an amount of 30–600 parts by weight and 0.01–10 parts by weight respectively for 100 parts by weight of the total of said polymer (A) and monomer (B).

As the (meth)acrylic polymer (A), those obtained by polymerization of monomer components essentially containing (meth)acrylic acid and methyl methacrylate are preferable due to the good weather resistance and other desirable characteristics of the molded product.

The carboxyl group necessary for thickening is recommended to be from 0.05 to 1.5 moles in terms of the carboxyl group in 1000 g of the (meth)acrylic polymer. The preferable mixing ratio between the polymer and the monomer in the acrylic syrup is that 7–80 parts by weight of the (meth)acrylic polymer (A) vs. 93–20 parts by weight of the monomer (B). An oxide and/or hydroxide of an alkaline earth metal which works as the thickener may be used together in an amount of 5 parts by weight or less.

One of the most preferable processes for producing the (meth)acrylic molding material of the present invention comprises the steps of:(a) polymerizing monomer components essentially containing a vinyl monomer having (a) carboxyl group(s) and an alkyl (meth)acrylate monomer by bulk polymerization to synthesize a (meth)acrylic polymer (b) terminating the polymerization before a degree of polymerization reaches 100% to obtain an acrylic syrup and (c) adding 30–600 parts by weight of aluminum hydroxide and 0.01–10 parts by weight of a succinic acid derivative to 100 parts by weight of the acrylic syrup.

The inventive process may further comprise the step of adding one or more kinds of monomers having a vinyl group to the acrylic syrup.

The step of terminating the polymerization may preferably be conducted by adding one or more kinds of monomers having a vinyl group to a mixture of already synthesized (meth)acrylic polymer and remaining monomer and by decreasing the temperature of the mixture.

DESCRIPTION OF THE PREFERRED EMBODIMENT

The present inventors have concluded various studies on the causes for different thickening behaviors of the molding material, and found out that there was a noticeable increase of the viscosity in the system wherein aluminum hydroxide had been added as an inorganic filler. That means, such a phenomenon was recognized that when aluminum hydroxide blended as an inorganic filler was mixed with an acrylic syrup, immediately after they were mixed by applying a shear force, the viscosity of the molding material remained low, however, later the viscosity continued to increase with time. As the results of further studies, the present inventors found out that aluminum hydroxide or an inevitable impurity contained in the aluminum hydroxide product can increase the viscosity of the (meth)acrylic molding material and that this thickening behavior can be controlled by the use of a succinic acid derivative, and accomplished the present invention. The invention will be described in detail.

For the (meth)acrylic molding material of the present invention, so-called acrylic syrup is employed as a main component, which comprises (A) a (meth)acrylic polymer (in the present invention, "copolymer" is simply abbreviated to polymer for the sake of convenience) obtained by polymerization of monomer components essentially containing a vinyl monomer having (a) carboxyl group(s) and an alkyl (meth)acrylate monomer, and (B) one or more monomers having a vinyl group. It should be noted that the "acrylic syrup" is a mixture of methacrylic polymer and/or acrylic polymer and (B) monomer having a vinyl group.

As a vinyl monomer having (a) carboxyl group(s), which is the essential component to constitute the polymer (A) contained in the acrylic syrup, one or more monomers selected from unsaturated carboxylic acids such as acrylic acid, methacrylic acid, and crotonic acid, unsaturated dicarboxylic acids such as maleic acid, fumaric acid, itaconic acid and citraconic acid, and a monoester thereof etc. can be used. The vinyl monomer containing (a) carboxyl group(s) is preferably used such that the amount of the carboxyl group in 1000 g of the resulting polymer becomes 0.05–1.5 moles. An amount of the carboxyl group of less than 0.05 moles will fail to provide an enough increase in the viscosity as SMC or BMC, and the resulting SMC or BMC becomes tacky with an inferior handling property during the molding operation. Also the obtained molded product tends to have a pin hole and crack. On the other hand, an amount exceeding 1.5 moles will result in too large initial thickening and cause poor impregnation of a reinforcing fiber (mat and cloth etc.) during the production of SMC and BMC, thus after the molding, the reinforcing material might be separated from the compound or cracks might be generated. In order to avoid this sudden thickening, a large amount of the succinic acid derivative is required, however, the large amount of the succinic acid derivative is not preferable either, since the obtained molded product shows deteriorated physical properties including water resistance and weather resistance. Also, in the case of a cast molding material, the material viscosity increases during the kneading to prevent good defoaming, and the obtained molded product tend to have pin holes.

Examples of another essential component to constitute the polymer (A), i.e. an alkyl (meth)acrylate monomer include methyl (meth)acrylate, ethyl (meth)acrylate, butyl (meth) acrylate, propyl (meth)acrylate, 2-ethyl hexyl (meth) acrylate, lauryl (meth)acrylate, cyclohexyl (meth)acrylate, (meth)acryl amide, glycidyl (meth)acrylate and the like. One or more kinds of compounds selected from these can be used in admixture, and in particular, methyl methacrylate which provides a molded product of high quality, is preferably used as a main monomer.

If necessary, another vinyl monomer can be used as a monomer to constitute the polymer (A). However, the another vinyl monomer is preferably used in an amount which does not exceed the total amount of the essential components i.e. the vinyl monomer containing (a) carboxyl group(s) and the alkyl (meth)acrylate monomer.

Examples of another vinyl monomer to be used if necessary include styrene, α-methyl styrene, vinyl toluene, chlorostyrene, vinyl acetate, allyl alcohol, ethylene glycol monoallyl ether, propylene glycol monoallyl ether and the like.

An oligomer containing a vinyl group which can be copolymerized with a vinyl monomer containing (a) carboxyl group(s) and an alkyl(meth)acrylate monomer, such as an unsaturated polyester resin, a vinyl ester resin, and a reaction product of (meth)acrylate containing a hydroxyl group with polyisocyanate compound can be also used a part of the monomers.

The (meth)acrylic polymer (A) can be synthesized by polymerization of the above mentioned monomer components by a known method such as solution polymerization, bulk polymerization, emulsion polymerization, and suspension polymerization. In particular, bulk polymerization is preferable due to the good thickening condition of the resulting molding material. Further, by using bulk polymerization for preparing the acrylic syrup to be described later, the acrylic syrup can be obtained without complicated processes. A recommendable weight average molecular weight of the produced polymer is between 30,000 and 1,000,000, and a recommendable number average molecular weight is between 10,000 and 200,000, due to easy viscosity control, good molding workability as well as good physical properties of the molded product.

As a monomer containing a vinyl group (B) to be mixed with the produced polymer to form a liquid acrylic syrup, any monomer given above as the monomers to constitute the polymer (A) can be used. In particular, methyl methacrylate is most preferable.

As the monomer (B), a multifunctional crosslinking monomer can be used if necessary include multifunctional (meth)acrylates such as ethylene glycol di(meth)acrylate, diethylene glycol di(meth)acrylate, propylene glycol di(meth)acrylate, dipropylene glycol di(meth)acrylate, neopentyl glycol di(meth)acrylate, trimethylol propane tri (meth)acrylate, pentaerythritol tetra(meth)acrylate and divinyl benzene, diallylphthalate, diallyl isophthalate, triallyl cyanurate, triallyl isocyanurate and the like.

A preferable mixing ratio of the polymer (A) and the monomer (B) in the acrylic syrup is polymer (A) of 7–80 parts by weight vs. monomer (B) of 93–20 parts by weight. The acrylic syrup prior to the thickening preferably has a viscosity at 25° C. in a range of from 0.5 to 400 poises, more preferably from 1 to 200 poises. As the viscosity of the acrylic syrup changes according to the molecular weight of the polymer (A) and the amount of the carboxyl group, it is desirable that the amount of the monomer (B) is increased or decreased appropriately so as to control the viscosity to be in the above-mentioned range.

The (meth)acrylic molding material of the present invention contains aluminum hydroxide as one of the essential components in addition to the above-mentioned acrylic syrup. The present inventors found that the aluminum hydroxide works not only as a filler or extender but also as a thickener, thus both the aluminum hydroxide and the below-mentioned succinic acid derivative are essentially used in an optimum blending amount to control the viscosity of the molding material of the present invention.

Aluminum hydroxide may be mixed in an amount of 30–600 parts by weight with 100 parts by weight of the acrylic syrup. A preferable blending amount is 30–300 parts by weight when used as a SMC, 150–600 parts by weight when used as a BMC and 30–250 parts by weight when used as a cast molding material.

The aluminum hydroxide is preferably in the form of a particle, and an average particle size is, though it is not particularly limited, in a range of from 1 to 100 microns, preferably from 1 to 25 microns. The use of the aluminum hydroxide which has been treated on its surface with a known coupling agent improves the strength of the resulting molded product. The coupling agent includes various coupling agents such as a silane type, titanate type, aluminate type and zircoaluminate type, and the surface treatment can be carried out by a known process.

Examples of the aluminum hydroxide which are commercially and industrially available include "Higilite" series H-320, H-320ST (having received silane coupling treatment), H-341, H-100, HS-320 and the like, produced by Showa Denko, K.K. and CW-308, CW-316 and C-303 and the like produced by Sumitomo Chemical Co., Ltd.

Another essential component in the (meth)acrylic molding material of the present invention is a succinic acid derivative. The succinic acid derivative works to control the exceeded thickening of the acrylic syrup caused by aluminum hydroxide. In the system free from the succinic acid derivative, the viscosity of the molding material increases rapidly during the preparation of the material, that makes the following molding operation difficult, or causes such problems as insufficient impregnation of a reinforcing fiber including a glass fiber, insufficient defoaming and insufficient fluidity that results in a bad appearance, even when the molding operation could be performed. Accordingly, the (meth)acrylic molding material of the present invention has the succinic acid derivative as one of the essential components.

The succinic acid derivative of the present invention is a compound having a succinic acid skeleton or succinic acid anhydride skeleton and a substituent such as an alkyl, alicyclic, alkenyl and aromatic ring etc in the ethylene group moiety. According to the present invention, the succinic acid derivative is not limited to a single compound and a mixture of several kinds of isomers can be used as the succinic acid derivative. Particularly preferable example is a succinic acid derivative having from 8 to 30 total carbon atoms. The succinic acid derivative having total carbon atoms of less than 8 tends to show inferior solubility in the acrylic syrup and the derivative having the total carbon atoms exceeding 30 has a reduced activity in controlling the thickening.

Illustrative examples of the succinic acid derivative include succinic acid having an alkyl group of butyl or higher (heptyl succinic acid, octyl succinic acid, nonyl succinic acid, decyl succinic acid, dodecyl succinic acid, tetradecyl succinic acid, hexadecyl succinic acid, heptadecyl succinic acid, octadecyl succinic acid, pentadecyl succinic acid, pentadodecyl succinic acid, eicosyl succinic acid, and the like), succinic acid having alkenyl group (hexenyl succinic acid, heptenyl succinic acid, octenyl succinic acid, nonenyl succinic acid, decenyl succinic acid, dodecenyl succinic acid, tetradecenyl succinic acid, cyclododecyl succinic acid, cyclododecenyl succinic acid, hexadecenyl succinic acid, heptadecenyl succinic acid, octadecenyl succinic acid, pentadecenyl succinic acid, pentadodecenyl succinic acid, eicosenyl succinic acid) and diphenyl butenyl succinic acid, and anhydrides thereof. One or more than two kinds of succinic acid derivatives can be used.

The succinic acid derivative may be contained in an amount of 0.01–10 parts by weight in 100 parts by weight of the acrylic syrup. An amount of the succinic acid derivative of less than 0.01 parts by weight will fail to exhibit the thickening controlling effect and cause an inconvenience due to the rapid thickening of the molding material. An amount of the succinic acid derivative exceeding 10 parts by weight may degrade the water resistance of the resulting molded product, thus not preferable. The preferable limits of the amount of the succinic acid derivative used are as above, however, the thickening behavior of the molding material depends on the amount of the carboxyl group in the polymer contained in the acrylic syrup, the amount of the aluminum hydroxide and the amount of the succinic acid derivative, thus it is recommended that the amount of the carboxyl group, and the amount of the aluminum hydroxide be decided according to the molding process and the uses, then the amount of the succinic acid derivative be set or changed according to those amounts.

As a result of the further study of the present inventors, it is found out that the thickening effect of the aluminum hydroxide is provided by the aluminum hydroxide itself or a water soluble sodium compound which is an inevitable impurity contained in an industry product of the aluminum hydroxide. The sodium compound is inevitably contained in the raw material aluminum used for producing the aluminum hydroxide, and as it is presently impossible to obtain or produce aluminum hydroxide free from the sodium compound, it cannot be determined which has a stronger thickening effect, aluminum hydroxide or the sodium compound, however, there has been a tendency that the thickening behavior becomes milder when aluminum hydroxide of a relatively higher purity, i.e. aluminum hydroxide containing a smaller amount of sodium compound is used. Of course all the aluminum hydroxide which is available at moment can be used as the thickener of the molding material according to the present invention, however, since the thickening behavior may depend on the kind of the product, the control by the use of the succinic acid derivative shall become more and more important.

The (meth)acrylic molding material of the present invention contains the acrylic syrup, the aluminum hydroxide and the succinic acid derivative as essential components as described above, however, if necessary, various known additives can be added as well. Such additives will be hereinafter described. The additives shall not be limited to those illustrated below, and they can be used for other purposes than the purposes illustrated below.

[Polymerization initiators]

To obtain a hardened molded product by polymerization of monomers in the acrylic syrup, a polymerization initiator is preferably added. Illustrative examples include organic peroxides such as benzoyl peroxide, lauryl peroxide, methyl ethyl ketone peroxide, t-butyl peroxy-2-ethyl hexanoate, t-butyl peroxyoctoate, t-butyl peroxy benzoate, cumene hydroperoxide, cyclohexanone peroxide, dicumyl peroxide and the like, azo type compounds such as 2-2'- azobisisobutyronitrile, 2-phenylazo-2,4-dimethyl-4-methoxyvaleronitrile and the like. These initiators can be used in an amount of from 0.1 to 5 parts by weight for 100 parts by weight of the acrylic syrup. A polymerization inhibitor which has been generally used for SMC and BMC can be used together as well.

[Thickeners]

Since a rapid increase in the viscosity of the molding material of the present invention can be prevented by the effect of the succinic acid derivative, the thickening can be controlled even when a conventional thickener is partly used together with aluminum hydroxide. Accordingly, the use of an oxide or a hydroxide of an alkaline earth metal is not restricted. However, as the use of these thickeners tends to deteriorate the weather resistance or water resistance of the resulting molded product, the thickener is used in an amount of 5 parts by weight or less for 100 parts by weight of the acrylic syrup. Illustrative examples of the thickener include magnesium oxide, magnesium hydroxide, calcium oxide and calcium hydroxide and the like.

[Fillers]

Aluminum hydroxide which works not only as a thickener but also as a filler is one of the essential components according to the present invention, but an inorganic or organic filler may be added if necessary, such as calcium carbonate, barium sulfate, alumina, clay, talc, milled fiber, siliceous sand, river sand, diatomaceous earth, mica powder, gypsum, limestone, asbestos powder, glass powder, glass balls, and polymer beads.

[Reinforcing materials]

In order to increase the strength of a molded product, a reinforcing material in the form of a fiber etc is preferably compounded. Illustrative examples include inorganic fibers such as glass fiber, carbon fiber, metal fiber, and ceramics fiber, various organic fibers including aramide fiber, polyester fiber, and natural fibers, and their forms can be, for example, roving, cloth, mat, woven fabric, chopped roving, chopped strand and the like. The kind and the amount of the reinforcing material used can be decided according to the uses. The molding material of the present invention has a low viscosity and there is no excessive increase in the viscosity, the impregnation workability with these reinforcing fibers is excellent.

[Mold releasing agents]

In order to assure good releasing of the molded product from the molding die, a known mold releasing agent such as stearic acid, zinc stearate, aluminum stearate, calcium stearate, barium stearate, stearic acid amide, alkyl phosphates and silicone oil can be used.

[Coloring agents]

According to the uses of the molded product, a coloring agent such as a known inorganic pigment, an organic pigment and the like can be added.

[Low profile additives]

A low profile additive is preferably added when a dimensional stability of high precision is required. Examples of the low profile additive include a thermoplastic polymer such as polyethylene, polypropylene, polystyrene, polyethylene glycol, polypropylene glycol, cellulose butyrate, acetate, polyvinyl chloride, polyvinyl acetate, polycaprolactone, saturated polyester or a copolymer thereof and the like.

The production process of molding material of the present invention is not limited. Preferably the (meth)acrylic polymer is synthesized by bulk polymerization. Synthesis of a (meth)acrylic polymer was carried out by bulk polymerizing monomer components containing a vinyl monomer having (a) carboxyl group(s) and an alkyl (meth)acrylate monomers. At this time, when polymerization is terminated before the polymerization is completed, i.e., the degree of polymerization reaches 100%, there exists in the reaction vessel the mixture of already synthesized (meth)acrylic polymer and remaining monomer. The thus obtained products in the vessel can be used as acrylic syrup. It may be preferable to terminate the polymerization before the degree of polymerization reaches 80%. The polymerization may be terminated by adding monomer (B) having a vinyl group in the room temperature into the vessel and by decreasing the temperature in the vessel at a higher rate.

There may be adopted methods of rapidly decreasing the temperature around the vessel, adding inhibitor and introducing oxygen into the system to terminate polymerization. Also, it may be appreciated to prepare acrylic syrup by adding at least monomer (B) having a vinyl group (monomer identical to raw material monomer or different monomer) after the polymerization is completely terminated.

After preparing the acrylic syrup, the (meth) acrylic molding material can be obtained by adding aluminum hydroxide and a succinic acid derivative to the acrylic syrup, and adding the above-mentioned additive thereto if necessary. Then SMC and BMC can be prepared by a known production method thereof. The molding material of the present invention can be used not only for SMC and BMC but also for a cast molding material. The molding can be carried out according to the known conventional molding process and basically the heating is within the range of from 60° to 180° C., and the pressure is equal to or less than 20 MPa, however, they are not particularly limited.

The molding material of the present invention shows good workability since the viscosity of the molding material does not change essentially with time after its preparation and the resulting SMC and BMC do not show viscosity change with time either. In the case of cast molding, the defoaming or casting operation can be carried out easily. Besides, the optimal fluidity can be kept for a long time, the molded product produced by any molding process can have a beautiful appearance such as surface smoothness and the gloss. In addition, the impregnating ability of the molding material with a reinforcing fiber is excellent and it shows good dispersibility of the fibers when molded, accordingly, a quality (meth)acrylic type FRP can be produced too.

EXAMPLES

The present invention is further described by the following examples. These examples are not intended to limit the invention in any manner, and obviously many modifications and variations are possible without departing from the above and below teachings, but they are all within the spirit and scope of the invention. In the example, all parts and percentages are by weight, unless otherwise specified.

Example 1

[Production of Acrylic Syrup 1]

Into a reaction vessel with a stirrer, a thermometer, a nitrogen introduction tube and a cooler were added 190 parts of methyl methacrylate and 10 parts of methacrylic acid. Under nitrogen atmosphere of 80° C., 0.05 parts of azobisisobutyronitrile as a polymerization initiator and 0.8 parts of n-dodecyl mercaptan as a chain transferring agent were added thereto and bulk polymerization was carried out. When the viscosity of the polymer at 25° C. reached 30–35 poises, 50 parts of methyl methacrylate was added and it was quickly cooled to give Acrylic Syrup 1. The viscosity of the Syrup was 7 poises at 25° C. and the solid concentration was 20.8%. To examine the carboxyl group concentration in the syrup, it was re-precipitated in a large amount of methanol to give a polymer and titration with KOH was carried out. The carboxyl group concentration was 0.57 moles in 1000 g of the polymer.

[Thickening experiment 1]

How the thickening behavior is varied according to the kinds of aluminum hydroxide was examined, using the acrylic syrup 1. To make the change of the viscosity clearer, 15 parts of methylmethacrylate was added to 85 parts of acrylic syrup 1 to obtain diluted syrup, and 100 parts of three kinds of aluminum hydroxide shown in Table 1 were added to the diluted syrup respectively. The above three kinds of aluminum hydroxide were "Higilite" series produced by Showa Denko K.K. According to the catalog provided by the Showa Denko K.K., the amount of w-Na$_2$O is different among the three kinds of aluminum hydroxide shown in Table 1. It seems "w-" in w-Na$_2$O indicates Na$_2$O extractable with water. The total amount of Na$_2$O was 0.13 weight %, which was the same in the above three kinds of aluminum hydroxide.

The viscosity of the respective diluted syrups was measured, immediately after addition of aluminum hydroxide (initial stage), after 24 hours, and after 48 hours. The viscosity at the initial stage was measured at 25° C., and that after 24 hours and after 48 hours was measured at 40° C. The results were shown in Table 1.

TABLE 1

Influence of amount of w-Na$_2$O in Al(OH)$_3$

| Kind of Al(OH)$_3$ | H-320 | H-320ST | H-320I |
|---|---|---|---|
| Amount of w-Na$_2$O | 0.01% | 0.02% | 0.003% |
| Acrylic syrup 1 | 85 parts | 85 parts | 85 parts |
| Methylmethacrylate | 15 parts | 15 parts | 15 parts |
| Aluminum hydroxide | 150 parts | 150 parts | 150 parts |
| Viscosity (temp:poise) | | | |
| Initial stage (25° C.) | 47 | 49 | 42 |
| After 24 hrs (40° C.) | 8000 | 51000 | 45 |
| After 48 hrs (40° C.) | 44000 | 745000 | 47 |

As can be clearly seen from Table 1, the viscosity of the system using Higilite H-320I containing w-Na$_2$O in an amount of 0.003%, which is the least amount, did not change greatly. On the other hand, the viscosity of the system using Higilite H-320ST containing w-Na$_2$O in an amount of 0.02%, which is the most amount, increased greatly. Accordingly, it is presumable that w-Na$_2$O, inevitable impurity in aluminum hydroxide, has the thickening effect.

[Thickening experiment 2]

An experiment was conducted to confirm the control effect of thickening by the succinic acid derivative. In this experiment, acrylic syrup 1 was not diluted but used as it is, and 100 parts of Higilite H-320ST was added to 100 parts of acrylic syrup 1. The added amount of pentadodecenyl succinic acid was varied as shown in Table 2. The viscosity change with time was examined and the results were shown in Table 2.

TABLE 2

Influence of amount of pentadodecenyl succinic acid

| Acrylic syrup 1 | 100 parts | 100 parts | 100 parts | 100 parts |
|---|---|---|---|---|
| Aluminum hydroxide | 100 parts | 100 parts | 100 parts | 100 parts |
| Pentadodecenyl succinic acid | 0 part | 0.25 parts | 0.5 parts | 1 part |
| Viscosity | | | | |

TABLE 2-continued

Influence of amount of pentadodecenyl succinic acid

| (temperature:poise) | | | | |
|---|---|---|---|---|
| Initial stage (25° C.) | 132 | 72 | 73 | 51 |
| After 1 day (40° C.) | 60000 | 30000 | 30000 | 20000 |
| After 2 days (40° C.) | 120000 | 50000 | 40000 | 30000 |
| After 7 days (40° C.) | 800000 | 90000 | 70000 | 50000 |
| After 13 days (40° C.) | >1600000 | 120000 | 90000 | 60000 |
| After 16 days (40° C.) | >1600000 | 130000 | 100000 | 60000 |

As can be clearly seen from Table 2, the viscosity of the system without pentadodecenyl succinic acid remarkably increased with time. The viscosity of the system with pentadodecenyl succinic acid was favorably controlled.

[Production and molding of BMC]

Acrylic Syrup 1 in an amount of 100 parts was blended with 2 parts of pentadodecenyl succinic acid, 1 part of t-butyl peroxy-2-ethyl hexanoate as a polymerization initiator, 4 parts of zinc stearate as a mold releasing agent and 0.01 parts of p-benzoquinone as a polymerization inhibitor and 350 parts of aluminum hydroxide (Higilite H-320, produced by Showa Denko, K.K.) and glass fiber (¼ inch chopped strand) in an amount of 5% of the total weight were added thereto and kneaded by a double-arm kneader to give BMC. The obtained BMC was wrapped in a polyvinyl alcohol type film and matured at 40° C. for 1 day.

BMC after the maturation was used for pressure molding under heating in a die to give a molded product having a thickness of 3 mm. BMC after the maturation was free from tackiness and the operation was carried out under good conditions. The molding conditions were as follows;

Die temperature: upper die 110° C., lower die 100° C.

Molding pressure: 6 MPa

Pressure time: 10 minutes.

The obtained molded product had a gloss and good surface smoothness. Strength was measured according to JIS K-6911 and the bending strength was 115 MPa, and the tensile strength was 31 MPa. By accelerated weathering test of 1000 hours by the use of sunshine weather meter according to JIS A-1415, the obtained molded product did not show any substantial color change or chalking. In the process of kneading, maturation and molding, no inconvenience due to excessive thickening was recognized. Boiling test was carried out at 90° C. for 100 hours for evaluation of water resistance, and the molded product maintained a good gloss and caused no substantial discoloration.

Comparative Example 1

Kneading was carried out by a kneader in a process similar to that of Example 1, using the Acrylic Syrup 1 obtained in Example 1, but without adding pentadodecenyl succinic acid. During the kneading, sudden thickening happened and the kneading could not be continued.

Comparative Example 2

Kneading was carried out by a kneader in a process similar to that of Example 1, using the Acrylic Syrup 1 obtained in Example 1, but the amount of the pentadodecenyl succinic acid was increased from 2 parts to 11 parts. Though maturation was carried out at 40° C. for 1 day, thickening did not occur and tackiness remained. Pressure molding under heating was carried out in a process similar to that of Example 1, however, defoaming was poor and the obtained molded product had pin holes and cracks on the surface.

Comparative Example 3

Production of Acrylic Syrup 2 was carried out in a process similar to that of Example 1, wherein 10 parts of methyl methacrylate was employed instead of 10 parts of methacrylic acid. The viscosity of the Acrylic Syrup 2 was 10 poises at 25° C. and the solid concentration was 22.9%. BMC was produced in the process similar to that of Example 1 using the Syrup 2. Obtained BMC was matured at 40° C. for 1 day, but thickening did not occur and tackiness remained. BMC after the maturation was used for pressure molding under heating carried out in a process similar to that of Example 1. However, defoaming was poor and the produced molded product had pin holes and cracks on the surface.

Example 2

BMC was produced and molded in a process similar to that of Example 1, except that aluminum hydroxide used in BMC production of Example 1 (Higilite H-320) was replaced with aluminum hydroxide treated with a silane coupling agent (Higilite H-320 ST, produced by Showa Denko, K. K.) and the amount of the pentadodecenyl succinic acid was increased to 4 parts.

Any inconvenience caused by sudden thickening was not found in each step and BMC after the maturation was free from tackiness and showed good workability. The obtained molded product showed a good gloss and excellent surface smoothness. The evaluation of strength was carried out in a process similar to that of Example 1, and a bending strength of 126 MPa, a tensile strength of 39 MPa were obtained. The weather resistance and water resistance evaluation were carried out and very good results similar to those of Example 1 were obtained.

Comparative Example 4

Kneading was carried out by a kneader in a process similar to that of Example 2 except that pentadodecenyl succinic acid was not added. During the kneading, sudden thickening happened and the kneading could not be continued. Example 3

BMC was produced and molded in a process similar to that of Example 1 except that 1 part of magnesium oxide was added and the amount of pentadodecenyl succinic acid was increased to 3 parts.

Any inconvenience due to sudden thickening was not recognized in each step. BMC after the maturation was free from tackiness and showed good workability. The obtained molded product had a gloss and good surface smoothness. The weather resistance and water resistance evaluation showed that the gloss was a little bit poorer than that of Example 1, and a slight discoloration was recognized. In the water resistance test, a little discoloration was recognized. This is considered to be due to the use of magnesium oxide.

Comparative Example 5

Kneading was carried out by a kneader in a process similar to that of Example 3, except that pentadodecenyl succinic acid was not added. Sudden thickening happened during the kneading and the kneading could not be continued.

Example 4

Acrylic Syrup 3 was obtained in a process similar to that of the acrylic syrup production in Example 1 except that 50 parts of trimethylol propane trimethacrylate was used instead of 50 parts of methyl methacrylate and quickly cooled. The viscosity of this Syrup 3 was 8 poises at 25° C. and the solid concentration was 21.5%. BMC was produced and molded using the Syrup 3 in a process similar to that of Example 1.

Any inconvenience due to sudden thickening was not recognized in each step. BMC after the maturation was free from tackiness and showed good workability. The obtained molded product had a gloss and good surface smoothness. The strength evaluation was carried out in a process similar to that of Example 1 and the bending strength was 118 MPa, the tensile strength was 33 MPa. The weather resistance and water resistance evaluation were carried out and very good results similar to those of Example 1 were obtained.

Comparative Example 6

Kneading was carried out by a kneader in a process similar to that of Example 4 except that pentadodecenyl succinic acid was not added, but sudden thickening happened during the kneading and the kneading could not be continued.

Example 5

BMC was produced and molded in a process similar to that of Example 4 using Acrylic Syrup 3, except that 1 part of magnesium oxide was added and the amount of pentadodecenyl succinic acid was increased to 3 parts.

Any inconvenience due to sudden thickening was not recognized in each step. BMC after the maturation was free from tackiness and showed good workability. The obtained molded product had a gloss and good surface smoothness. The weather resistance and water resistance evaluation showed that the gloss was a little bit poorer than that of Example 1, and a slight discoloration was recognized. In the water resistance test, a little discoloration was recognized as well. This is considered to be due to the use of magnesium oxide.

Comparative Example 7

Kneading was carried out by a kneader in a process similar to that of Example 5 except that pentadodecenyl succinic acid was not added, but sudden thickening happened during the kneading and the kneading could not be continued.

Example 6

BMC was produced and molded in a process similar to that of Example 1, except that the amount of aluminum hydroxide (Higilite H-320) used in the BMC production of Example 1 was reduced from 350 parts to 250 parts and 100 parts of calcium carbonate (Whiton P-70, produced by Toyo Fine Chemical Co., Ltd.) was added.

Any inconvenience due to sudden thickening was not recognized in each step. BMC after the maturation was free from tackiness and showed good workability. The obtained molded product had a gloss and good surface smoothness.

The weather resistance and water resistance evaluated showed that the gloss was a little bit poorer than that of Example 1, and a slight discoloration was recognized. Also, in the water resistance test, a little discoloration was recognized too.

Example 7

[Production of Acrylic Syrup 4]

Into a reaction vessel with a stirrer, a thermometer, a nitrogen introduction tube and a cooler, was added 1000 g of toluene and the vessel was purged sufficiently with nitrogen. A mixture comprising 190 parts of methyl methacrylate, 10 parts of methacrylic acid, 0.5 parts of azobisisobutyronitrile and 0.3 parts of n-dodecylmercaptan as a chain transferring agent was added to the reaction vessel dropwise for about 4 hours and polymerization was carried out at 90° C. in nitrogen atmosphere. After the dropping was finished, 0.5 parts of azobisisobutyronitrile was added and the reaction was further carried out at 90° C. for 3 hours. After the polymerization reaction was completed, toluene was removed to some degree under reduced pressure by heating and a polymer was reprecipitated in methanol, then washed with methanol several times. The obtained polymer was dried at 60° C. under reduced pressure for 12 hours. The number average molecular weight measured by GPC was 50,000. The amount of carboxyl group measured by titration with KOH was 0.58 moles in 1000 g of the polymer. The polymer in an amount of 20 parts was dissolved in 80 parts of methyl methacrylate to give Acrylic Syrup 4. The viscosity of the Syrup at 25° C. was 6 poises.

[Production and molding of SMC]

Acrylic Syrup 4 in an amount of 100 parts was mixed with 2 parts of pentadodecenyl succinic acid, 1 part of t-butyl peroxy-2-ethyl hexanoate as a polymerization initiator, 4 parts of zinc stearate as a mold releasing agent, 0.01 parts of p-benzoquinone as a polymerization inhibitor and 150 parts of aluminum hydroxide treated with silane coupling agent (Higilite H-320ST). The resin material compound was coated on a polyethylene film to a fixed thickness. Glass fiber chopped rovings of 1 inch were uniformly scattered on the layer. Another polyethylene film wherein the compound layer was also coated was placed on the scattered glass fibers to provide a SMC comprising the compound layers holding glass fibers between them. The glass fibers were so scattered that the amount became 25% of the total weight of SMC. The obtained SMC was wrapped in a cellophane film and matured at 40° C. for 1 day. SMC after the maturation was free from tackiness.

SMC after the maturation was pressure molded under heating in a die to provide a molded product having a thickness of 3 mm. The molding conditions were the same as those for BMC. The obtained mold product had a gloss and good surface smoothness. The strength was measured in the process similar to that of Example 1; the bending strength was 203 MPa, and the tensile strength was 87 MPa. By accelerated weathering test, the molded product showed no substantial color change nor chalking. Also in the water resistance test, the molded product had good results. In each step of coating, impregnating, maturing and molding, any inconvenience due to excessive thickening was not recognized. The SMC after the maturation was left at 25° C. for 2 weeks, then subjected to the similar molding process, and it produced a good molded product, the quality of which was as good as above-mentioned molded product.

Comparative Example 8

Molding was carried out in a process similar to that of Example 7 except that pentadodecenyl succinic acid was not added. SMC immediately after the maturation provided a molded product of nearly the same quality, however, the SMC after being left at 25° C. for 1 week following the maturation felt hard, did not flow uniformly during the molding process and could not produce a molded product having good surface smoothness.

Example 8

Acrylic Syrup 5 was produced in a process similar to that of Acrylic Syrup production in Example 7 except that the obtained polymer (20 parts) was dissolved in a mixture comprising 70 parts of methyl methacrylate and 10 parts of ethylene glycol dimethacrylate instead of 80 parts of methyl methacrylate. The viscosity of the Syrup 5 was 6 poises at 25° C.

Production and molding of SMC was carried out using the Syrup 5 in a process similar to that of Example 7. Any inconvenience due to excessive thickening was not recognized in coating, impregnating, maturing and molding steps. The gloss, surface smoothness, strength, weather resistance and water resistance of the obtained molded product and storage stability of the SMC were excellent similar to those of the product of Example 7.

Example 9

Production and molding of SMC was carried out using the Acrylic Syrup 5 of Example 8 in a process similar to that of Example 8 except that 1 part of magnesium oxide was added. Any inconvenience due to sudden thickening was not recognized in each step. The produced molded product showed a gloss and good surface smoothness. The weather resistance and water resistance were evaluated and the product had a little inferior gloss than that of the product of Example 8, and showed a slight discoloration. In the water resistance test, a little discoloration was also recognized.

Reference Example 1

Production of Acrylic Syrup 6 was carried out in a process similar to that of Acrylic Syrup production in Example 7 except that 199.4 parts of methyl methacrylate and 0.6 parts of methacrylic acid were used instead of 190 parts of methyl methacrylate and 10 parts of methacrylic acid. The other conditions were the same as those of Example 7. The number average molecular weight of the polymer was 52,000, and the amount of carboxyl group contained in 1000 g of the polymer measured by the titration with KOH, was 0.03 moles.

Production and molding of SMC was carried out in a process similar to that of Example 7 by the use of the Acrylic Syrup 6. Due to the small amount of the carboxyl group, the product after the maturation at 40° C. for 1 day still had tackiness. The produced molded product had pin holes and cracks slightly and showed somewhat inferior properties than those of the molded product of Example 7.

Reference Example 2

Production of Acrylic Syrup 7 was carried out in a process similar to that of Acrylic Syrup production in Example 7 except that 166 parts of methyl methacrylate and 34 parts of methacrylic acid were used instead of 190 parts of methyl methacrylate and 10 parts of methacrylic acid. The other conditions were the same as those of Example 7. The number average molecular weight of the polymer was 51,000, and the amount of the carboxyl group contained in 1000 g of the polymer measured by the titration with KOH was 2.00 moles.

Production of SMC was carried out using the Acrylic Syrup 7 in a process similar to that of Example 7. As the thickening proceeded during the production process and the material had a relatively high viscosity, complete impregnation condition could not be attained when the material in the form of a sheet was laminated each other after glass fibers were scattered on it. After it was matured at 40° C. for 1 day, molding was carried out in a process similar to that of Example 7, but the flow and the dispersion of the glass fibers were poor and the product had partly inferior surface smoothness.

Example 10
[Production of an artificial marble]

Acrylic Syrup 1 in an amount of 100 parts was blended with 20 parts of trimethylol propanetrimethacrylate, and 6 parts of pentadodecenyl succinic acid, 1 part of bis(4-t-butylcyclohexyl)peroxy dicarbonate as a polymerization initiator, and 200 parts of aluminum hydroxide (Higilite H-320 ST) were added thereto and kneaded and defoamed. The resulting molding material was cast into a glass cell mold and hardened at 60° C. for 1 hour. The hardened product was taken out of the cell mold and aftercuring was carried out at 100° C. for 3 hours.

The obtained product provided a sufficient quality of marble. The molding material had a viscosity low enough to carry out the casting operation and after it was allowed to stand for several days, the viscosity did not change and no sedimentation of aluminum hydroxide was recognized.

Comparative Example 9

An artificial marble was produced in a process similar to that of Example 10 except that pentadodecenyl succinic acid was not added. During the kneading the viscosity of the material suddenly increased excessively and the defoaming could not be carried out well. The sedimentation of aluminum hydroxide could not be recognized due to the foams, which could not be removed during the cast molding after all, and the produced molded product had a lot of foams and showed an inferior appearance.

The above results are shown in Tables 3, 4 and 5.

TABLE 4

| | SMC | | | | | |
|---|---|---|---|---|---|---|
| | Ex. 7 | Com. 8 | Ex. 8 | Ex. 9 | Ref. 1 | Ref. 2 |
| Acrylic Syrup 4 | 100 | 100 | | | | |
| Acrylic Syrup 5 | | | 100 | 100 | | |
| Acrylic Syrup 6 | | | | | 100 | |
| Acrylic Syrup 7 | | | | | | 100 |
| Al(OH)$_3$ treated with silane | 150 | 150 | 150 | 150 | 150 | 150 |
| Pentadodecenyl succinic acid | 2 | 0 | 2 | 2 | 2 | 2 |
| MgO | — | — | — | 1 | — | — |
| Thickening | O | O | O | O | Δ | O |
| Viscosity change with time | O | X | O | O | O | Δ |
| Impregnating ability | O | O | O | O | O | Δ |
| Moldability | O | X | O | O | Δ | Δ |
| Weather resistance | O | — | O | Δ | — | — |
| Water resistance | O | — | O | Δ | — | — |

TABLE 5

| | Cast Molding | |
|---|---|---|
| | Ex. 10 | Com. 9 |
| Acrylic Syrup 1 | 100 | 100 |
| Al(OH)$_3$ treated with silane | 200 | 200 |
| Pentadodecenyl succinic acid | 6 | 0 |
| Viscosity change with time | O | X |
| Sedimentation of Al(OH)$_3$ | O | O |
| Defoaming | O | X |

As aluminum hydroxide is utilized not only as an inorganic filling agent and bulking filler, but also as a thickener in the (meth)acrylic molding material of the present invention, the thickening of the molding material can be

TABLE 3

| | BMC | | | | | | | | | | | | | |
|---|---|---|---|---|---|---|---|---|---|---|---|---|---|---|
| | Ex. 1 | Com. 1 | Com. 2 | Com. 3 | Ex. 2 | Com. 4 | Ex. 3 | Com. 5 | Ex. 4 | Com. 6 | Ex. 5 | Com. 7 | Ex. 6. |
| Acrylic Syrup 1 | 100 | 100 | 100 | | 100 | 100 | 100 | 100 | | | | | 100 |
| Acrylic Syrup 2 | | | | 100 | | | | | | | | | |
| Acrylic Syrup 3 | | | | | | | | | 100 | 100 | 100 | 100 | |
| Al(OH)$_3$ | 350 | 350 | 350 | 350 | | | 350 | 350 | 350 | 350 | 350 | 350 | 250 |
| Al(OH)$_3$ treated with silane | | | | | 350 | 350 | | | | | | | |
| Calcium carbonate | | | | | | | | | | | | | 100 |
| Pentadodecenyl succinic acid | 2 | 0 | 11 | 2 | 4 | 0 | 3 | 0 | 2 | 0 | 3 | 0 | 2 |
| MgO | — | — | — | — | — | — | 1 | 1 | — | — | 1 | 1 | — |
| Thickening | O | Δ | X | X | O | Δ | O | Δ | O | Δ | O | Δ | O |
| Viscosity change with time | O | X | — | — | O | X | O | X | O | X | O | X | O |
| Kneadability | O | X | O | O | O | X | O | X | O | X | O | X | O |
| Moldability | O | — | X | X | O | — | O | — | O | — | O | — | O |
| Weather resistance | O | — | — | — | O | — | Δ | — | O | — | Δ | — | Δ |
| Water resistance | O | — | — | — | O | — | Δ | — | O | — | Δ | — | Δ | carried out without using any other thickener, besides the excessive thickening of the molding material can be controlled by the combined use of a succinic acid derivative and aluminum hydroxide. Accordingly the molding material of the present invention can be applied for BMC, SMC as well as cast molding process, shows good workability in each molding process, and provides a quality molded product having good appearance and high strength etc.

In particular, the molding material of the present invention shows good workability and good storage stability, since the change of the viscosity is very little during the production of BMC and SMC molding material, and the change of the viscosity of produced SMC and BMC with time is very little as well. The defoaming and casting operation can be easily carried out in cast molding process. The optimal fluidity can be kept for a long time, the molded product produced in any molding process, has a beautiful appearance, such as the surface smoothness and gloss. It also shows good impregnation workability to reinforcing fibers, and shows good dispersibility of fibers during pressure molding under heating, thus the (meth)acrylic type FRP of high quality having high strength, uniform physical properties and appearance can be produced.

The (meth)acrylic molding material of the present invention having above-mentioned features can be used for various molded products since it provides a molded product having good weather resistance, beautiful appearance and high strength. Particularly, it is useful for lighting domes, outdoor benches and tables, outdoor tanks, structuring materials for automobiles, railway trains and ships etc, external members of the building structures such as roofs and walls, members exposed outside of buildings such as advertising boards etc, an artificial marble for bathtub and kitchen counter, water proof pan and the like, in which beautiful appearance and water resisting property are advantageously utilized, and other electric parts and members etc.

What is claimed is:

1. A (meth)acrylic molding material comprising an acrylic syrup comprising (A) a (meth)acrylic polymer obtained by polymerizing monomer components comprising a vinyl monomer having (a) carboxyl group(s) and an alkyl (meth) acrylate monomer, and (B) one or more monomers containing a vinyl group, wherein aluminum hydroxide in an amount of from 30 to 600 parts by weight and a succinic acid derivative in an amount of from 0.01 to 10 parts by weight are added for 100 parts by weight of the total of said (meth)acrylic polymer(A) and monomer (B), and said succinic acid derivative is a succinic acid derivative having from 8 to 30 total carbon atoms.

2. A molding material according to claim 1, wherein said (meth)acrylic polymer (A) is obtained by polymerization of monomer components comprising (meth)acrylic acid and methyl methacrylate.

3. A molding material according to claim 1, wherein the amount of carboxyl group contained in 1000 g of said (meth)acrylic polymer (A) is from 0.05 to 1.5 moles.

4. A molding material according to claim 1, wherein the amount of said (meth)acrylic polymer (A) is from 7 to 80 parts by weight, and the amount of said monomer (B) is from 93 to 20 parts by weight, based on 100 parts by weight of the total of said (meth)acrylic polymer (A) and monomer (B).

5. A molding material according to claim 1, wherein an oxide and/or a hydroxide of an alkaline earth metal is further contained in an amount of 5 parts by weight or less, based on 100 parts by weight of the total of said (meth)acrylic polymer (A) and monomer (B).

6. A process for producing a (meth)acrylic molding material according to any one of claims 1–4 and 5, comprising the steps of:
   (a) polymerizing monomer components comprising a vinyl monomer having (a) carboxyl group(s) and an alkyl (meth)acrylate monomer by bulk polymerization to synthesize a (meth)acrylic polymer;
   (b) terminating said polymerization before a degree of polymerization reaches 100% to obtain an acrylic syrup; and
   (c) adding 30–600 parts by weight of aluminum hydroxide and 0.01–10 parts by weight of a succinic acid derivative having from 8 to 30 total carbon atoms to 100 parts by weight of said acrylic syrup.

7. A process according to claim 6, further comprising the step of adding one or more monomers having a vinyl group to said acrylic syrup.

8. A process according to claim 6, wherein the step of terminating the polymerization is conducted by adding one or more monomers having a vinyl group to a mixture of already synthesized (meth)acrylic polymer and remaining monomer and by decreasing the temperature of the mixture.

* * * * *